Dec. 3, 1968 D. P. DOLBY 3,414,683

ADJUSTABLE FLUID ROTARY BEARINGS FOR USE IN A SYNCHRONOUS TRANSFORMER ROTARY HEAD RECORDER

Filed April 2, 1964 5 Sheets-Sheet 1

DALE P. DOLBY
INVENTOR.

BY Robert G. Clay

ATTORNEY

INVENTOR.
DALE P. DOLBY
BY
Robert G. Clay
ATTORNEY

Dec. 3, 1968 D. P. DOLBY 3,414,683
ADJUSTABLE FLUID ROTARY BEARINGS FOR USE IN A SYNCHRONOUS TRANSFORMER ROTARY HEAD RECORDER
Filed April 2, 1964 5 Sheets-Sheet 3

DALE P. DOLBY
INVENTOR.

BY Robert G. Clay

ATTORNEY

Dec. 3, 1968 D. P. DOLBY 3,414,683

ADJUSTABLE FLUID ROTARY BEARINGS FOR USE IN A SYNCHRONOUS TRANSFORMER ROTARY HEAD RECORDER

Filed April 2, 1964 5 Sheets-Sheet 4

DALE P. DOLBY
INVENTOR.

BY Robert H. Clay

ATTORNEY

DALE P. DOLBY
INVENTOR.

BY Robert S. Clay

ATTORNEY

United States Patent Office 3,414,683
Patented Dec. 3, 1968

3,414,683
ADJUSTABLE FLUID ROTARY BEARINGS FOR USE IN A SYNCHRONOUS TRANSFORMER ROTARY HEAD RECORDER

Dale P. Dolby, East Palo Alto, Calif., assignor to Ampex Corporation, Redwood City, Calif., a corporation of California Filed Apr. 2, 1964, Ser. No. 356,893
11 Claims. (Cl. 179—100.2)

ABSTRACT OF THE DISCLOSURE

A rotating head drum for magnetic tape recording and reproducing is mounted on the shaft of an electric motor, and signals to and from the rotating heads are coupled to stationary circuits through transformers. One half of each transformer is mounted on a sleeve that is slidably mounted on the shaft and keyed thereto and each rotating transformer half axially faces the corresponding other half, which is stationary. The sleeve is springloaded to urge the corresponding transformer halves together, and an adjustable stationary thrust bearing is provided to engage the extending end of the sleeve to adjust the transformer spacings. A variation of the arrangement includes an air bearing for the motor shaft, in which the head drum acts as an air thrust bearing for the shaft.

This invention relates to bearings for members that rotate and translate on the same axis, and to motors, commutating devices, and magnetic tape recording and reproducing machines making use of such bearings.

In the magnetic tape machine rotary head art, one or more transducing heads were mounted on a drum and rotated in contact with a moving magnetic tape. During recording and reproducing modes, signals were passed to and from the heads by means of electrical brushes engaging commutating rings on the drum shaft. Recently, rotating transformer couplings have been substituted for such commutating devices to avoid physical contact and wear between moving parts. Such couplings often include pairs of facing discs or rings each of which is one half of a transformer. In each pair, one of the rings is mounted on the chassis of the machine, and one rotates with the head drum. In such an arrangement, the facing rings must be spaced very precisely and closely together, and the spacing must be adjustable at will, a requirement not pertaining to the brush-and-commutating-ring devices previously known. The requirement is complicated by the fact that the head drum and rotating transformer rings are driven by an electric motor, the rotor of which is mounted in standard journal and thrust bearings so as to have a predetermined axial alignment and (preferably) substantially no freedom of movement in an axial direction. One of the problems that is presented is to journal the motor rotor, the head drum, and the rotating transformer rings accurately on the same rotational axis. Another problem is to preserve a degree of freedom for axial adjustment between the rotating and the stationary transformer rings.

A prior solution to the above problems has been to mount the rotating transformer rings on separate journal and thrust bearings with a flexible coupling to the drive motor shaft, and to make the stationary (i.e., nonrotating) transformer rings axially adjustable. Such structure performs excellently with motors journalled in ball bearings, but must be very carefully and precisely manufactured in order to limit axial play in the bearings and rotational displacements in the flexible coupling. A less expensive structure with greater manufacturing tolerances is desirable.

When it is desired to use a gas (e.g., air) bearing motor, an additional but analogous problem is presented. Such motors are generally formed with a stator having a bore defining in part a journal bearing for the rotor that is inserted therein, and a pair of thrust bearing plates or discs mounted on the rotor and confronting the two ends of the stator. Gas (air) under pressure is fed to the mid-portion of the stator bore for floating the rotor therein, and the air flows out both ends of the bore and between the thrust plates and stator to cushion the rotor frictionlessly against axial movement. Clearly, the physical clearances between the thrust plates and stator must be very precisely dimensioned during the manufacturing process, and even so, end play of the rotor is not entirely eliminated.

The problem of constructing an air bearing motor that has minimum end play, without requiring close manufacturing tolerances, is in principle similar to the problem of mounting a rotating transformer coupling for axial adjustment in combination with any type of motor. In both problems the essential object is to mount two or more rotatable elements in precise axial alignment but variable axial spacing.

Accordingly, it is an object of this invention to provide bearing means for mounting a plurality of rotating elements for rotation and relative translation on the same axis.

It is another object of this invention to provide a combination driving and commutating means for rotating transducing heads in a magnetic tape transport.

It is a further object of this invention to provide an air-bearing motor that can be inexpensively manufactured.

It is still a further object of this invention to provide a combination driving and commutating means including an inexpensive air-bearing motor for use with rotating transducing heads in a magnetic tape transport.

These and other objects of the invention are accomplished in a device in which an electric motor has an axially extending output shaft on which are mounted a rotating head drum and an array of commutating transformer halves that are slidable axially on the shaft but are keyed for rotation therewith. The rotatable transformer halves may thus be accurately positioned axially with respect to a corresponding array of stationary transformer halves that are mounted integrally with the stator of a motor, and yet the rotating transformer halves rotate precisely on the same axis as the rotor of the motor. A compression spring between the shaft and the rotating transformer halves urges the latter away from the motor, while an adjustable thrust bearing, comprising a single bearing ball and adjusting screw, limits such movement of the rotating transformer halves and is used to position them. Such a device may incorporate either a ball-bearing-mounted or an air-bearing-mounted motor. Such an air-bearing motor may include either a pair of thrust plates, as known in the art, or a single thrust plate limiting motion of the rotor away from the stationary transformer halves. Another form of the invention is an air-bearing motor in which a pair of thrust plates are mounted for conjoint rotation but are axially slidable with respect to one another and are urged by a tension spring toward one another and toward the confronting ends of the stator.

A better understanding of the invention may be had by reference to the following description, taken in conjunction with the accompanying drawings, in which.

Figure 1:
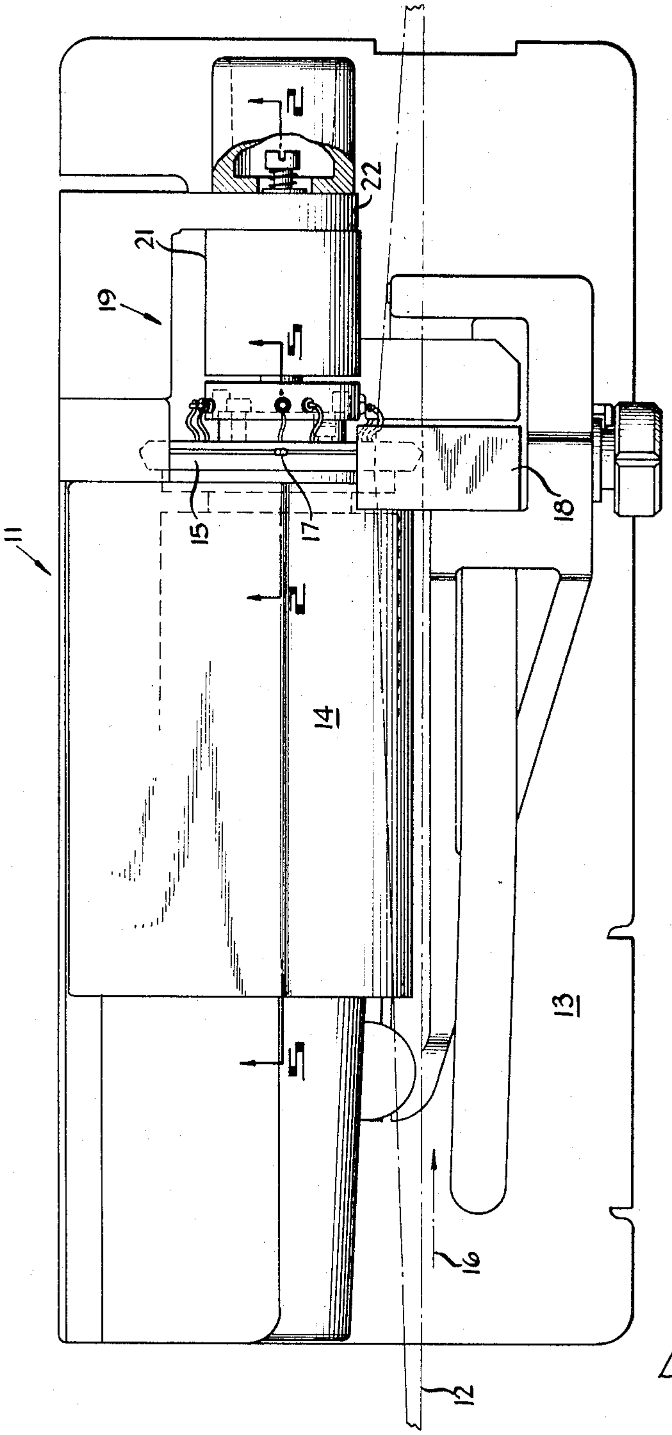
FIGURE 1 is a plan of a rotary head magnetic tape transducing apparatus incorporating the invention.
Figure 2:
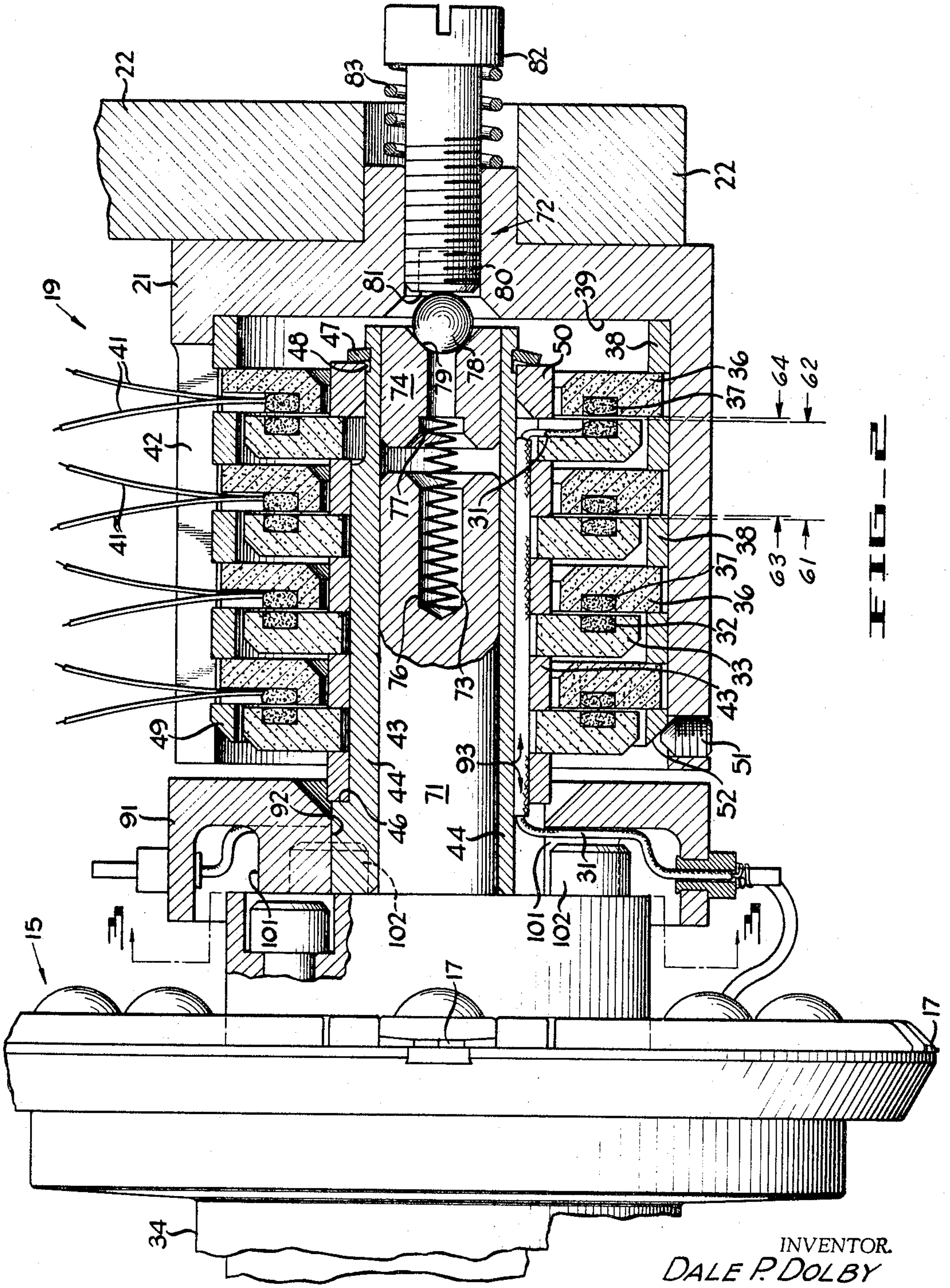
FIGURE 2 is an elevation section to an enlarged scale of a portion of the apparatus shown in FIGURE 1 and taken substantially along the plane of lines 2—2 of FIG- URE 1, and also along the plane of lines 2—2 of FIGURE 3.
Figure 3:
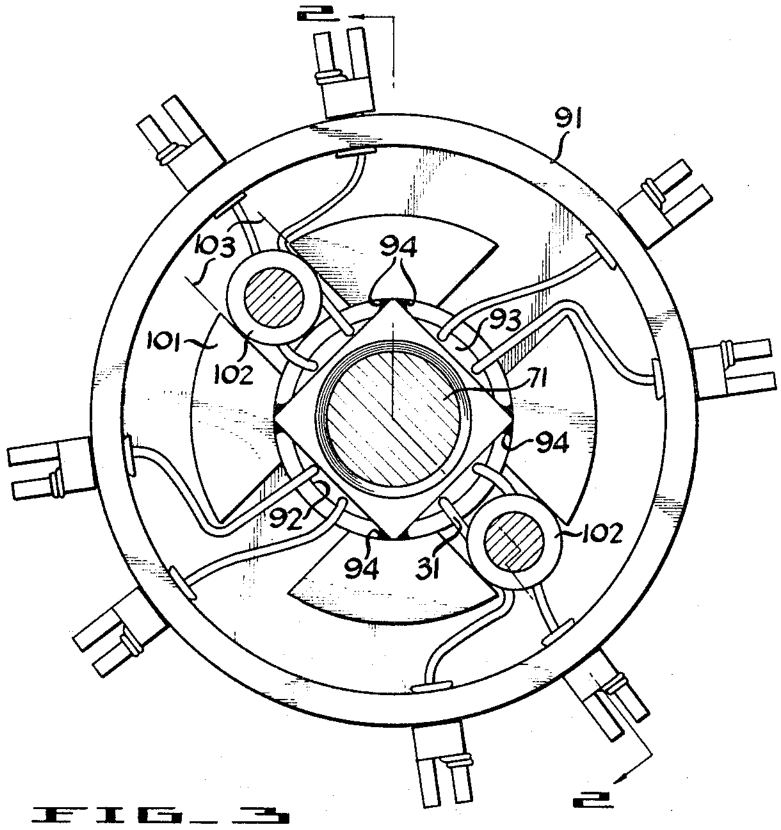
FIGURE 3 is an elevation section taken substantially along the plane of lines 3—3 of FIGURE 2.

Referring now to the drawings, and particularly to FIGURES 1–3 thereof, there is shown a typical rotary head transducing apparatus 11 for a magnetic tape 12. The apparatus includes as important features a base plate 13 on which is mounted an electric motor 14, on the output shaft of which is mounted a rotating head drum 15. The tape 12 is drawn, by means not here shown, in a longitudinal direction as shown by arrow 16 and substantially parallel to the axis of head drum 15 so as to be transversely engaged by the rotating head drum 15 and so as to be swept in succession by each of four magnetic transducing heads 17 in passage. A retractable arcuate guide 18 is provided to hold the tape in curved engagement with the head drum 15. An electrical transformer coupling device 19 is enclosed in a housing 21 that is also solidly mounted on the base plate 13, as by means of a mounting bracket 22, and serves to provide transmission of electrical signals between the rotating head 17 and various electrical circuits that are fixed in relation to the base plate 13, without physical contact between the rotating heads and the fixed circuits.

To provide the signal transmission coupling desired, each of the magnetic heads 17 is coupled by means of a pair of electrical leads 31 to a coil 32 arranged concentric to the axis of the motor 14 and mounted in an annular transformer core disc 33 that rotates with the rotor 34 of the motor. Confronting each of the rotating discs and coils 32 is a fixed transformer core 36 also formed as an annular disc and having mounted therein a fixed coil 37. Each core 36 is permanently mounted on a corresponding spacing ring 38, and the rings with cores attached are inserted in a cylindrical interior cavity 39 of the housing 21 so as to form a stack of axially spaced cores 36. The leads 41 of the respective coils 37 are conducted through a slot 42 in the housing 21 to the exterior thereof and to the various electronic circuits previously referred to. Each of the rotating transformer cores 33 is also permanently mounted on a corresponding spacing ring 43, and the cores with rings attached are mounted on an axially arranged shaft member 44 so as to form a stack of axially spaced rotating cores. The stack of rotating cores 33 is retained on the shaft 44 by means of a shoulder 46 and a retaining ring 47 engaging a recess 48 in the shaft 44; and a spacing ring 50 is inserted between the retaining ring 47 and the nearest core 33. The stack of fixed cores 36 is retained in the housing 21 as by means of a clamp ring 49, which in turn is retained and tightened as by means of three circumferentially spaced set screws 51 threaded through the housing 21 and engaging a conical surface 52 on the ring 49.

It will be understood that a very small physical gap is desired between the confronting surfaces of each of the rotating cores 33 and the corresponding stationary core 36, in order to provide electrical coupling without physical contact. It is also desirable to arrange that the gap between each pair of confronting transformer cores is exactly the same as the gap between every other pair of confronting transformer cores at any given moment; and it is further desirable that the gaps between all pairs of confronting cores be variable and adjustable at will. By methods such as the lapping method described in copending U.S. patent application No. 232,850 "Signal Transmission Coupling Device" by Walter Cheney, filed Oct. 24, 1962, now U.S. Patent No. 3,179,909, the axial dimension 61–62 of each rotating core and ring assembly 33, 43 is made to be precisely the same as the axial dimension 63–64 of the fixed core and ring assembly 36, 38 that lies substantially in the same plane, so that the conditions described above as desirable are brought about. There remains however the problem of providing adjustable relative axial movement between the stack of fixed cores and the stack of rotating cores, while at the same time coupling the rotatable cores for rotation with the rotor of the motor, which rotor is ordinarily mounted in bearings that do not permit any substantial axial movement. This problem also has the corollary problem of mounting the shaft 44 for rotation with the rotor without employing a separate journal bearing system for the shaft 44, so as to avoid the alignment problems commonly associated with the rotational coupling of two elements having separate journal bearings.

The solution adopted by the present invention is to form the rotatable core shaft 44 as a hollow tube mounted for axial sliding motion on an extension 71 of the motor output shaft, and to key the shaft 44 for rotation with the rotor 34. The axial position of the shaft 44 is then rendered adjustable as by means of an adjustable thrust bearing 72 mounted on the fixed housing 21, and the shaft 44 is urged at all times against the thrust bearing 72 as by means of a compression spring 73 extending between the end of the motor output shaft 71 and a bushing element 74 that is press-fitted into and forms a permanent part of the hollow shaft 44. The spring 73 is seated in a recess 76 of the shaft 71 and a recess 77 of the bushing 74. The thrust bearing 72 includes a hard bearing ball 78, formed for example of sapphire or tungsten carbide, which is seated in a conical recess 79 in the bushing 74 and bears against a tungsten carbide insert 80 having a broad flat end face 81 and set in a bolt 82 that is threaded through the end of the housing 21. A compression spring 83 is loaded between the housing 21 and the head of the bolt 82 to ensure that play in the threads is taken up. It will be seen that with the structure described, when the bolt 82 is screwed in so as to move to the left as shown in the drawing, the gaps between all of the confronting faces of the rotating and stationary transformer cores are increased by precisely the same amounts; and the gaps are decreased when the bolt 82 is screwed outward so as to move to the right as shown in the drawing. It will also be seen that with the structure described a substantial tolerance is permissible in the relationship of concentricity between the axes of the rotatable and stationary transformer halves. In other words, the entire housing 21, stationary transformer halves and bolt 82 may be displaced in a direction transverse to the axis of the shaft 71 without substantially impairing the coupling action between the transformer cores. This permissible tolerance is of great advantage in the economical manufacture and assembly of the apparatus.

The electrical and mechanically keyed couplings between the rotating cores 33 and the head drum 15 are accomplished by means of a connector block 91, which is made of electrically insulating material and which has a circular central opening 92 by which it is mounted on the shaft 44. The shaft 44 is formed to have a square cross-sectional outline at the end adjacent the head drum 15, so as to leave a number of axially directed passageways 93 between the sides of the shaft 71 and the circular interior recesses of the connector block 91 and rotating core rings 43 for the passage of the lead wires 31. The connector block 91 is secured to the corners of the shaft 44 as by means of dollops 94 of a suitable adhesive such as epoxy resin. The corners of the shaft 44 are somewhat rounded in the region of the rotating transformed rings 43 so as to provide the shoulder 46 and to conform to the circular inner openings of the rings 43. For mechanically keying the block 91 and head drum 15, a number of spaced bosses 101 are provided on the connector block 91 and are engaged by the heads of a pair of bolts 102, which are threaded into the head drum 15 and rotor 34. The axial depths of the recesses 103, between the bosses 101, are substantially greater than the penetration of the heads of bolts 102, so that the connector block 91 may move in an axial direction along with the shaft 44 while still effectively keying the block and shaft to the head drum and rotor for rotation therewith. While in the illustrated example there are four bolts 102, the heads of all but two of these bolts are countersunk into the head drum 15 so that the keying effect is provided only by two of the bolts, and manufacture and assembly of the apparatus is rendered more efficient.

It will be seen that the above-described structure provides a first rotatable element, including the rotor 34, head drum 15 and shaft 71, that is mounted in journal bearing means (the journal bearings of the motor); and a second rotatable element, including the shaft 44, cores 33, and block 91, that is mounted for axial sliding motion on the shaft 71 and is keyed to the shaft and head drum 15 for rotation therewith; and that the spring 73 urges the two elements in opposite axial directions with respect to one another, while a pair of thrust bearing means (namely the thrust bearing 72 and at least one of the thrust bearings of the motor) each engage and hold one of the rotatable elements against the urging of the spring 73 and operate to limit the extent of motion of the respective rotatable elements in an axial direction.

Figure 4:
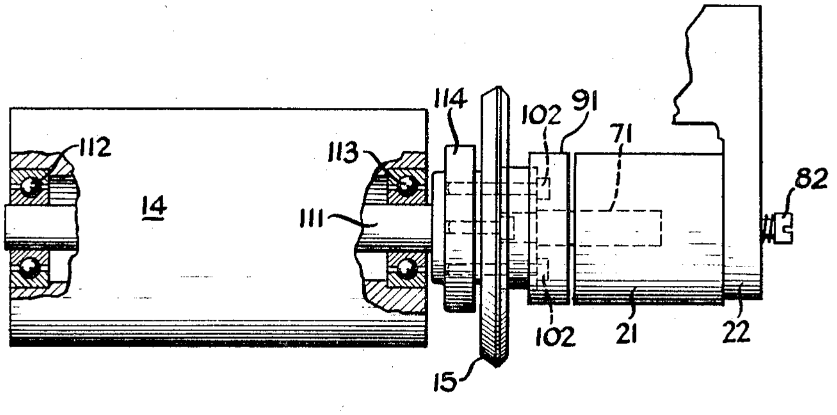
FIGURE 4 is a plan of a portion of the apparatus shown in FIGURE 1, broken away to show details thereof.

The motor 14 may be a typical electric motor as shown in FIGURE 4, in which the rotor shaft 111 is journalled in ball bearings 112 and 113, which also operate as thrust bearings in that they restrain the shaft 111 against axial movement. When such a typical electric motor is used, a coupling member 114 is secured to the output end of the shaft 111, and the bolts 102 are threaded through the head drum 15 and into the coupling member 114. The extension 71 is formed as an integral extension of the shaft 111.

Figure 5:
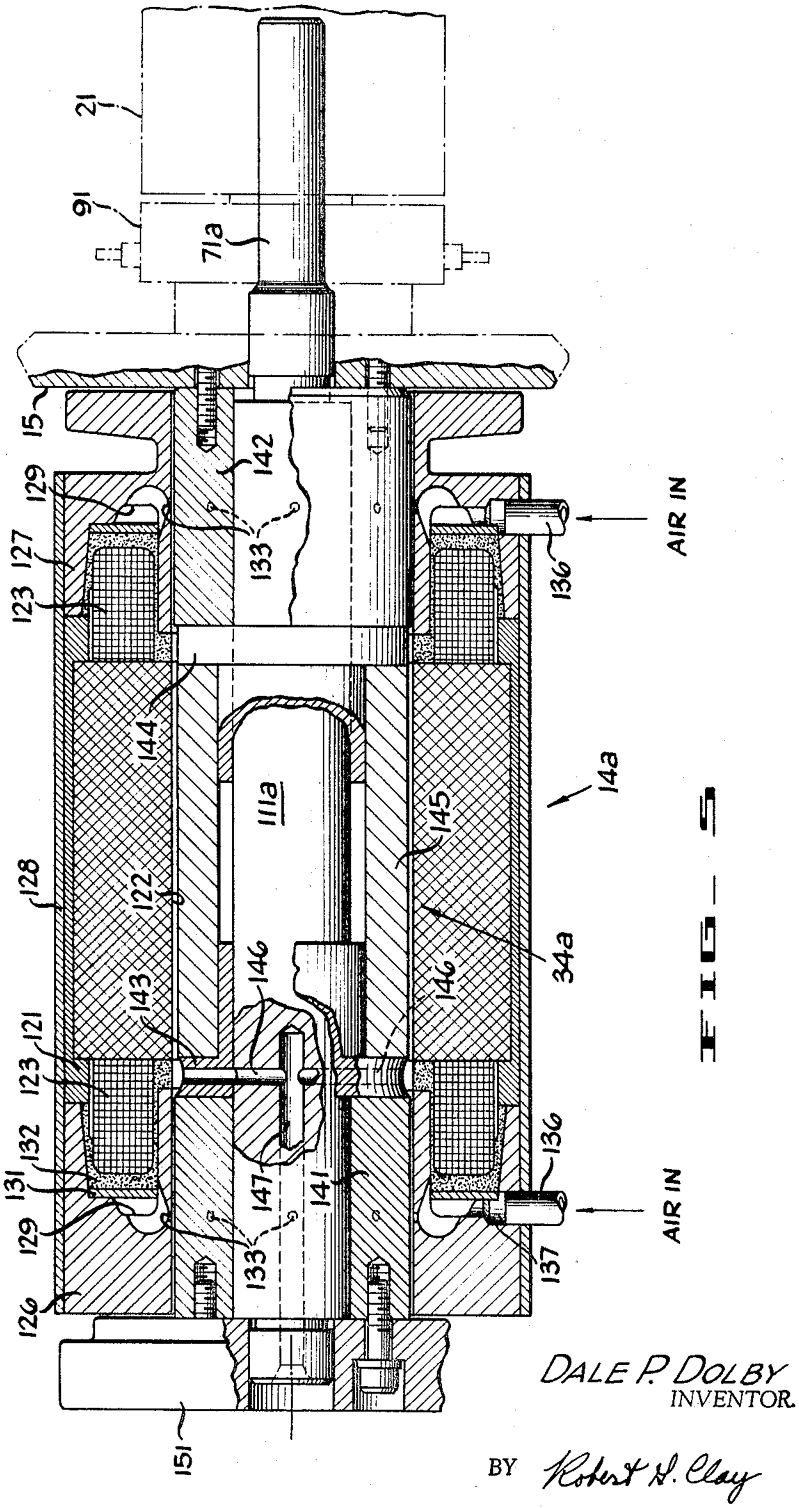
FIGURE 5 is an elevation section to an enlarged scale of a variation of the apparatus shown in FIGURE 1 taken substantially as on the plane of lines 5—5 of FIGURE 1.

A variational form of the motor to be used in the structure of the invention is illustrated in FIGURE 5, which shows an air-bearing motor 14*a*. In this motor, the stator is formed with a central coil mounting member 121, having an interior bore 122 and serving to mount an electrical coil 123, while a pair of end bells 126 and 127 are fitted over the ends of the coil and are coupled to the central mounting member 121 as by means of a tubular shell 128 that extends axially in both directions from the central member 121 and covers portions of both of the end bells 126, 127. Each end bell is cast to have a ring-shaped concentric recess 129 that is closed during assembly by means of an air-seal washer 131 and a quantity of epoxy adhesive and sealing material 132 so as to define a concentric air distributing manifold surrounding the central bore 122 and communicating therewith by means of a plurality of circumferentially spaced very small diameter orifices 133 for admitting pressurized air to the bearing surfaces of the rotor. The pressurized air is conducted to the manifold 129 from a source (not shown) by means of a conduit 136 and a passage 137 formed in the shell 128 and the corresponding end bell 126, 127. The rotor 34*a* has a central shaft 111*a* terminating in an extension 71*a*. A pair of end bearing sleeves 141 and 142 are mounted on the shaft 111*a*. Between the sleeves 141, 142 are mounted a pair of stepped mounting sleeves 143 and 144. On the sleeves 143, 144 is mounted a central sleeve 145 formed for example of cobalt and forming the electrical portion of the rotor for cooperation with and for being driven in rotation by the coil 123. The cobalt sleeve 145 and sleeves 143, 144, are of appreciably smaller diameter than the bearing sleeves 141, 142 so as to define a central toroidal chamber in which the pressurized air is permitted to expand; and the air in this chamber is bled off as by means of a plurality of radial passages 146 communicating with an axial passageway 147 that opens at the end of the shaft 111*a* remote from the extension 71*a*. It will be seen that when pressurized air is forced through the orifices 133 in bells 126, 127, against the bearing surfaces of the rotor sleeves 141, 142, the air from each group of orifices 133 tends to flow in both axial directions. The air that flows axially to the right as shown in the drawing between bell 127 and sleeve 142 must flow radially outwardly between bell 127 and head drum 15 so as to provide a thrust bearing for the rotor 34*a*; and the air that flows axially to the left as shown in the drawing between the bell 126 and sleeve 141, must flow radially outwardly between the bell 126 and a disc-like thrust plate 151 that is mounted on the corresponding end of the shaft 111*a*, and thus forms a thrust bearing for the other end of the rotor. The air that flows axially toward the midpoint of the rotor 34*a* enters the enlarged chamber between the cobalt sleeve 145 and mounting member 121, and is bled off by the passages 146, 147. The passages 146 can be located at any axial position between the sleeves 141, 142, but located as here shown located in the shaft 111*a* and sleeve 143, and as close to the sleeve 141 as possible, so as to avoid the sleeve 145 and so as to be as close as possible to the exit end of the passageway 147.

Figure 6:
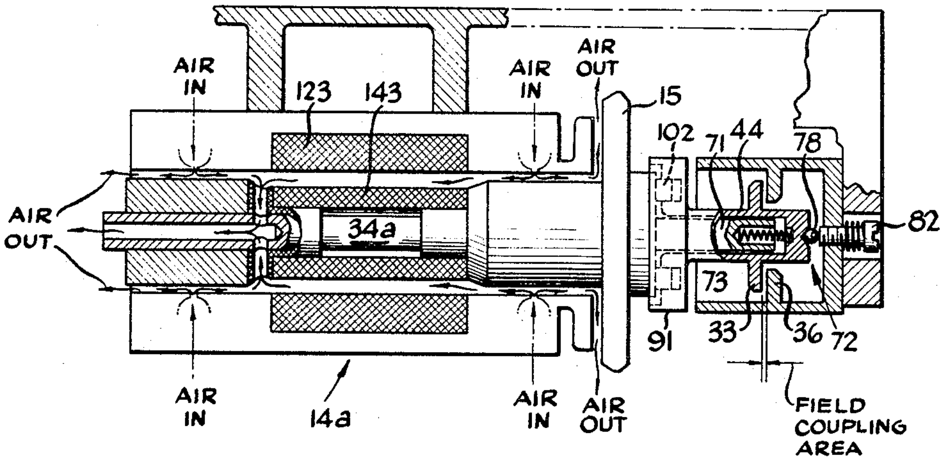
FIGURE 6 is a schematic view of a variational form of the invention.

When the motor 14*a* is used alone, both the thrust plate 151 and that represented by the head drum 15 must be used to maintain the motor in the assembled condition. However, when the motor is used with the structure of FIGURE 2, it will operate satisfactorily without the thrust plate 151 as shown schematically in FIGURE 6. This figure shows the paths of the pressurized air internally of the motor. The thrust bearing between the stator and head drum 15 restrains and limits the motion of the rotor and its extension 71 in a direction to the left as shown in the drawing, while the mechanical thrust bearing 72 engages and restrains the second rotatable element 41, 91 against axial motion to the right as shown in the figure and as urged by the spring 73.

Figure 7:
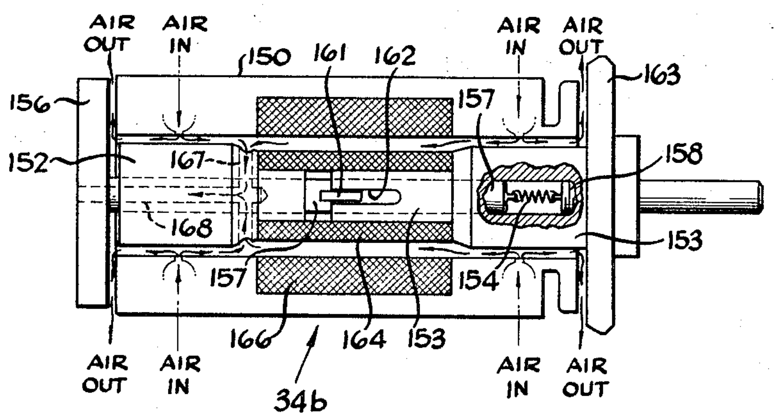
FIGURE 7 is a schematic view of another variational form of the invention.

As a further variational form of the invention, an air bearing motor is shown in FIGURE 7 including a stator 150 and a rotor 34*b* comprising two rotatable elements 152 and 153, keyed for conjoint rotation, the element 153 being mounted on and for axial sliding motion with respect to the element 152, and the elements being coupled by means of a tension spring 154. Particularly, the element 152 includes a thrust plate portion 156 and a portion 157 of reduced diameter, which fits into a corresponding bore 158 in the element 153. A radially extending key 161 on the portion 157 engages a key-way groove 162 in the element 153. The element 153 also includes a thrust plate portion 163 and has a cobalt sleeve 164 cooperating with an electrical coil 166 in the stator 151. Pressurized air is schematically shown as being provided through the stator 151 to the bearing portions of the elements 152, 153 as previously described; the sleeve 164 has a reduced diameter; and bleed-off passages 167, 168 are provided in the element 152. It will be seen that this structure provides a resiliently variable axial spacing between the thrust plate portions 156, 163, the spacing being a function of the air pressure introduced to the bearings, and being continuously suitable for providing the pressurized air thrust bearings needed in the motor without the necessity for close tolerance machine and precision assembly that is required in the arrangement shown in FIGURE 5. It will be understood that when the motor is not to be used with a mechanical thrust bearing such as bearing 72 of FIGURE 6, then two thrust plates such as the plates 15 and 151 of FIGURE 5 must be used, but that the arrangement of FIGURE 5 requires careful assembly and precision adjustment of the axial spacing between the plates 15 and 151 in order that precisely the right gaps between the plates and stator are provided to ensure an effective support by the air cushion portion of the thrust bearing. By the arrangement of FIGURE 7, however, the gap between each plate 156, 163 and the stator 151 is automatically established by the spring 158 and the air pressure so as to achieve the desired effect, without the need for close manufacturing tolerances.

It will be seen that the arrangement of FIGURE 7 also provides the essential structure of the invention in which first and second rotatable elements 152, 153 are keyed for conjoint rotation and are mounted for relative axial sliding motion; the spring 154 is coupled to the two elements and urges them in opposite axial directions, and a pair of thrust bearings 156, 163 restrain the axial motions of the elements as urged by the spring.

Thus there has been described a device in which an electric motor has an axially extending output shaft on which are mounted a rotating head drum and an array of commutating transformer halves that are slidable axially on the shaft but are keyed for rotation therewith. The rotatable transformer halves may thus be accurately positioned axially with respect to a corresponding array of stationary transformer halves that are mounted integrally with the stator of the motor, and yet the rotating transformer halves rotate precisely on the same axis as the rotor of the motor. A compression spring between the shaft and rotating transformer halves urges the latter away from the motor, while an adjustable thrust bearing, comprising a single ball bearing and adjusting screw, limits such movement of the rotating transformer halves and is used to position them. Such a device may incorporate either a ball-bearing-mounted or an air-bearing-mounted motor. Such an air-bearing motor may include either a pair of thrust plates, as known in the art, or a single thrust plate limiting motion of the rotor away from the stationary transformer halves. Another form of the invention is an air-bearing motor in which a pair of thrust plates are mounted for conjoint rotation but are axially slidable with respect to one another and are urged by a tension spring toward one another and toward the confronting ends of the stator.

What is claimed is:

1. Apparatus for mounting a rotatable element in predetermined axially spaced relation to a fixed element, comprising:
- an electric motor including a stator, a rotor, and means including journal and thrust bearings for mounting said rotor for rotation and for limited axial movement with respect to said stator;
- said fixed element being mounted on said stator adjacent an end of said rotor;
- said rotatable element being mounted on said end of said rotor for axial sliding motion with respect thereto toward and away from said fixed element, said rotatable element being keyed to said rotor for rotation therewith;
- means coupled between said rotor and said rotatable element for urging said rotatable element in a first axial direction; and
- a thrust bearing engaging and holding said rotatable element against the urging of said last-named means, said thrust bearing being mounted on said motor stator and being adjustable to vary the axial position of said rotatable element and to position said rotatable element independently of said rotor and in said predetermined axially spaced relation to said fixed element.

2. Apparatus for mounting a rotatable element in predetermined axially spaced relation to a fixed element, comprising:
- an electric motor including a stator, a rotor, and means including journal and thrust bearings for mounting said rotor for rotation and for limited axial movement with respect to said stator;
- a shaft extending from one end of said rotor;
- said fixed element being mounted on said stator adjacent said shaft;
- said rotatable element being mounted on said shaft for axial sliding motion with respect thereto toward and away from said fixed element, said rotatable element being keyed to said rotor for rotation therewith;
- a compression spring coupled between said shaft and said rotatable element for urging said rotatable element in a first axial direction toward said fixed element; and
- a thrust bearing engaging and holding said rotatable element against the urging of said spring, said thrust bearing being mounted on said motor stator and being adjustable to vary the axial position of said rotatable element and to position said rotatable element independently of said rotor and in said predetermined axially spaced relation to said fixed element.

3. In a magnetic tape transport of the class having one or more transducing heads mounted on a rotating drum, a commutating apparatus comprising:
- an electric motor including a stator, a rotor, and means including journal and thrust bearings for mounting said rotor for rotation and for limited axial movement with respect to said stator, said drum being mounted integrally with said rotor for rotation therewith;
- a shaft extending from one end of said rotor;
- a fixed transformer half mounted on said stator adjacent said shaft;
- a rotatable transformer half mounted on said shaft for axial sliding motion with respect thereto toward and away from said fixed transformer half, said rotatable transformer half being keyed to said rotor and drum for rotation therewith and being electrically coupled to at least one of said transducing heads;
- a compression spring coupled between said shaft and said rotatable transformer half for urging said rotatable transformer half in a first axial direction toward said fixed transformer half; and
- a thrust bearing engaging and holding said rotatable transformer half against the urging of said spring, said thrust bearing being mounted on said motor stator and being adjustable to vary the axial position of said rotatable transformer half and to position said rotatable transformer half independently of said rotor and in predetermined axially spaced relation to said fixed transformer half.

4. In a magnetic tape transport of the class having one or more transducing heads mounted on a rotating drum, a commutating apparatus comprising:
- an electric motor including a stator, a rotor, and means including journal and thrust bearings for mounting said rotor for rotation and for limited axial movement with respect to said stator, said drum being mounted integrally with said rotor for rotation therewith;
- a shaft extending from one end of said rotor;
- a fixed transformer half mounted on said stator adjacent said shaft;
- a rotatable transformer half mounted on said shaft for axial sliding motion with respect thereto toward and away from said fixed transformer half, said rotatable transformer half being keyed to said rotor and drum for rotation therewith and being electrically coupled to at least one of said transducing heads;
- a compression spring coupled between said shaft and said rotatable transformer half for urging said rotatable transformer half in a first axial direction toward said fixed transformer half; and
- a thrust bearing engaging and holding said rotatable transformer half against the urging of said spring, said thrust bearing including a flat-ended screw threaded through said motor stator and fixed transformer half substantially on the rotational axis of said rotor and rotatable transformer half, and a ball bearing mounted in a conical recess in said rotatable transformer half and engaged by said flat ended screw, said screw and ball bearing being adjustable to vary the axial position of said rotatable transformer half and to position said rotatable transformer half independently of said rotor and in predetermined axially spaced relation to said fixed transformer half.

5. In a magnetic tape transport of the class having one or more transducing heads mounted on a rotating drum, a commutating apparatus comprising:

an electric motor including a stator, a rotor, and means including journal and thrust bearings for mounting said rotor for rotation and for limited axial movement with respect to said stator, said drum being mounted integrally with one end of said rotor for rotation therewith;

a main shaft having a base flange, said base flange being secured to said drum and rotor by means of a plurality of bolts so as to be integrally mounted with said drum and said one end of said rotor;

said stator having a bracket portion extending beyond said drum and confronting the extending end of said main shaft;

a cup-shaped transformer housing mounted on said bracket and surrounding said extending end of said main shaft;

a fixed transformer half formed as a ring and coaxially mounted in said housing around said main shaft;

a rotatable transformer shaft formed as a hollow tube with an integral plug at one end and mounted on said main shaft with said plug confronting the extending end of said main shaft, said transformer shaft being arranged on said main shaft for axial sliding motion with respect thereto through said ring-shaped fixed transformer half, said rotatable transformer shaft having a flange confronting said base flange of said main shaft and being keyed to said main shaft, rotor and drum for rotation therewith as by means of conforming recesses formed in said transformer shaft flange and fitting over the heads of said bolts projecting from said main shaft flange;

a rotatable transformer half formed as a ring and coaxially secured to said transformer shaft in confronting relation to said ring-shaped fixed transformer half, said rotatable transformer half being electrically coupled to at least one of said transducing heads;

a compression spring coupled between said main shaft and said plug for urging said rotatable transformer half in a first axial direction toward said fixed transformer half; and a thrust bearing engaging and holding said rotatable transformer half against the urging of said spring, said thrust bearing including a flat-ended screw threaded through said motor stator and fixed transformer half housing substantially on the rotational axis of said rotor and rotatable transformers half, and a ball bearing mounted in a conical recess in said plug and engaged by said flat ended screw, said screw and ball bearing being adjustable to vary the axial position of said rotatable transformer half and to position said rotatable transformer half independently of said rotor and in predetermined axially spaced relation to said fixed transformer half.

6. In a magnetic tape transport of the class having a plurality of transducing heads mounted on a rotating drum, a commutating apparatus comprising:

an electric motor including a stator, a rotor, and means including journal and thrust bearings for mounting said rotor for rotation and for limited axial movement with respect to said stator, said drum being mounted integrally with one end of said rotor for rotation therewith;

a main shaft having a base flange, said base flange being secured to said drum and rotor by means of a plurality of bolts so as to be integrally mounted with said drum and said one end of said rotor;

said stator having a bracket portion extending beyond said drum and confronting the extending end of said main shaft;

a cup-shaped transformer housing mounted on said bracket and surrounding said extending end of said main shaft;

a plurality of fixed transformer halves formed as rings and coaxially spacably mounted in said housing around said main shaft;

a rotatable transformer shaft formed as a hollow tube with an integral plug at one end and mounted on said main shaft with said plug confronting the extending end of said main shaft, said transformer shaft being arranged on said main shaft for axial sliding motion with respect thereto through said ring-shaped fixed transformer half, said rotatable transformer shaft having a flange confronting said base flange of said main shaft and being keyed to said main shaft, rotor and drum for rotation therewith an by means of conforming recesses formed in said transformer shaft flange and fitting over the heads of said bolts projecting from said main shaft flange;

a plurality of rotatable transformer halves formed as rings and coaxially spacably secured to said transformer shaft each in confronting relation to one of said ring-shaped fixed transformer halves, each of said rotatable transformer halves being electrically coupled to one of said transducing heads;

a compression spring coupled between said main shaft and said plug for urging said rotatable transformer halves in a first axial direction toward said fixed transformer halves; and a thrust bearing engaging and holding said rotatable transformer halves against the urging of said spring, said thrust bearing including a flat-ended screw threaded through said motor stator and fixed transformer half housing substantially on the rotational axis of said rotor and rotatable transformer halves, and a ball bearing mounted in a conical recess in said plug and engaged by said flat ended screw, said screw and ball bearing being adjustable to vary the axial position of said rotatable transformer halves and to position said rotatable transformer halves independently of said rotor and in predetermined axially spaced relation to said fixed transformer halves.

7. Gas bearing apparatus for mounting a rotatable element in predetermined axially spaced relation to a fixed element, comprising:

an electric motor including a stator, a rotor, and gas journal bearing means mounting said rotor for rotation with respect to said stator;

gas thust bearing means for limiting movement of said rotor in a first axial direction;

said fixed element being mounted on said stator adjacent an end of said rotor;

said rotatable element being mounted on said end of said rotor for axial sliding motion with respect thereto in a second and opposite axial direction toward said fixed element and away therefrom, said rotatable element being keyed to said rotor for rotation therewith;

means coupled between said support member and said rotatable element for urging said rotatable element in said second axial direction; and a thrust bearing engaging and holding said rotatable element against the urging of said last-named means, said thrust bearing being mounted on said motor stator and being adjustable to vary the axial positoin of said rotatable element and to position said rotatable element independently of said rotor and in said rotor and in said predetermined axially spaced relation to said fixed element.

8. Thrust bearing apparatus for an electric motor including a stator, a rotor, and gas journal bearing means mounting said rotor for rotation, comprising:

gas thrust bearing means for limiting movement of said rotor in a first axial direction;
a rotatable element mounted on said rotor for axial sliding motion with respect thereto, said rotatable element being keyed to said rotor for rotation therewith;
means coupled between said rotor and said rotatable element for urging said rotatable element in a second axial direction opposite to said first axial direction; and
a thrust bearing engaging and holding said rotatable element against the urging of said last-named means.

9. Bearing apparatus for an electric motor including an annular stator and a rotor disposed coaxially within the central bore of said stator, comprising:
a source of pressurized gas coupled to said central bore of said stator and providing gas flow between said stator and rotor from the mid portions of said stator and rotor toward the ends thereof;
a disc-shaped thrust plate mounted coaxially on said rotor and confronting one end of said stator to define a channel for said gas flow from said one end radially outwardly, with said gas flow acting as a thrust bearing pad to limit movement of said rotor in a first axial direction toward the other end of said stator;
a rotatable element mounted on said rotor for axial sliding motion with respect thereto, said rotatable element being keyed to said rotor for rotation therewith;
means coupled between said rotor and said rotatable element for urging said rotatable element in a second axial direction opposite to said first axial direction; and
a thrust bearing engaging and holding said rotatable element against the urging of said last-named means.

10. In a magnetic tape transport of the class having one or more transducing heads mounted on a rotating drum, a drive and commutating apparatus comprising:
an electric motor including an annular stator and a rotor disposed coaxially within the central bore of said stator;
a source of pressurized gas coupled to said central bore of said stator and providing gas flow from the mid-portion of said stator toward the ends;
said drum being mounted coaxially on said rotor and confronting one end of said stator to define a channel for said gas flow from said one end radially outwardly, with said gas flow acting as a thrust bearing pad to limit movement of said rotor in a first axial direction toward the other end of said stator;
a main shaft having a base flange, said base flange being secured to said drum and rotor by means of a plurality of bolts so as to be integrally mounted with said drum and rotor with said main shaft extending in a second axial direction opposite to said first axial direction;
said stator having a bracket portion extending beyond said drum and confronting the extending end of said main shaft;
a cup-shaped transformer housing mounted on said bracket and surrounding said extending end of said main shaft;
a fixed transformer half formed as a ring and coaxially mounted in said housing around said main shaft;
a rotatable transformer shaft formed as a hollow tube with an integral plug at one end and mounted on said main shaft with said plug confronting the extending end of said main shaft, said transformer shaft being arranged on said main shaft for axial sliding motion with respect thereto through said ring-shaped fixed transformer half, said rotatable transformer shaft having a flange confronting said base flange of said main shaft and being keyed to said main shaft, rotor and drum for rotation therewith as by means of conforming recesses formed in said transformer shaft flange and fitting over the heads of said bolts projecting from said main shaft flange;
a rotatable transformer half formed as a ring and coaxially secured to said transformer shaft in confronting relation to said ring-shaped fixed transformer half, said rotatable transformer half being electrically coupled to at least one of said transducing heads;
a compression spring coupled between said main shaft and said plug for urging said rotatable transformer half in a first axial direction toward said fixed transformer half; and
a thrust bearing engaging and holding said rotatable transformer half against the urging of said spring, said thrust bearing including a flat-ended screw threaded through said motor stator and fixed transformer half housing substantially on the rotational axis of said rotor and rotatable transformer half, and a ball bearing mounted in a conical recess in said plug and engaged by said flat ended screw, said screw and ball bearing being adjustable to vary the axial position of said rotatable transformer half and to position said rotatable transformer half independently of said rotor and in predetermined axially spaced relation to said fixed transformer half.

11. Bearing apparatus for an electric motor including an annular stator and a rotor disposed coaxially within the central bore of said stator; comprising:
said stator having a coil-wound mid-portion and two journal bearing end portions;
said end portions each being provided with a plurality of radial inlet passages communicating with said bore;
a source of pressurized gas coupled to said inlet passages of said stator and providing gas flow in said bore between said rotor and stator and from the mid-portion of said stator toward the ends;
a disc-shaped thrust plate mounted coaxially on said rotor and confronting one end of said stator to define a channel for said gas flow from said one end radially outwardly, with said gas flow acting as a thrust bearing pad to limit movement of said rotor in a first axial direction toward the other end of said stator;
said rotor being provided with a plurality of radial outlet passages in the region of that bearing end portion of said stator that is remote from said thrust plate, communicating with an axial outlet passage opening to atmosphere at the end of said rotor remote from said thrust plate;
a rotatable element mounted on said rotor for axial sliding motion with respect thereto, said rotatable element being keyed to said rotor for rotation therewith;
means coupled between said rotor and said rotatable element for urging said rotatable element in a second axial direction opposite to said first axial direction; and
a thrust bearing engaging and holding said rotatable element against the urging of said last-named means.

References Cited

UNITED STATES PATENTS

| | | | |
|---|---|---|---|
| 3,177,493 | 4/1965 | Durlofsky | 346—74 |
| 3,179,909 | 4/1965 | Cheney | 336—120 |

FOREIGN PATENTS

| | | |
|---|---|---|
| 203,979 | 1923 | Great Britain. |

BERNARD KONICK, *Primary Examiner.*

H. STECKLER, *Assistant Examiner.*